US011128704B2

(12) United States Patent
Johnson et al.

(10) Patent No.: US 11,128,704 B2
(45) Date of Patent: Sep. 21, 2021

(54) LINKING CONTENT ITEMS AND COLLABORATION CONTENT ITEMS

(71) Applicant: Dropbox, Inc., San Francisco, CA (US)

(72) Inventors: Lars Johnson, San Francisco, CA (US); David Wetterau, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 486 days.

(21) Appl. No.: 15/282,886

(22) Filed: Sep. 30, 2016

(65) Prior Publication Data

US 2018/0097877 A1  Apr. 5, 2018

(51) Int. Cl.
*H04L 29/08* (2006.01)

(52) U.S. Cl.
CPC .......... *H04L 67/1095* (2013.01); *H04L 67/06* (2013.01); *H04L 67/1097* (2013.01)

(58) Field of Classification Search
CPC . H04L 67/1095; H04L 67/1097; H04L 67/06; G06F 17/30011; G06F 17/3089
See application file for complete search history.

(56) References Cited

U.S. PATENT DOCUMENTS

| | | | | |
|---|---|---|---|---|
| 5,220,657 | A * | 6/1993 | Bly .................. | G06Q 10/10 707/E17.007 |
| 6,466,941 | B1 * | 10/2002 | Rowe .................. | G06F 16/958 707/786 |
| 6,584,466 | B1 * | 6/2003 | Serbinis .............. | G06F 21/6218 715/209 |
| 7,818,678 | B2 * | 10/2010 | Massand ............. | G06F 17/2229 715/751 |
| 2002/0184255 | A1 * | 12/2002 | Edd ...................... | G06F 16/958 715/205 |
| 2003/0093525 | A1 * | 5/2003 | Yeung .................... | H04L 29/06 709/225 |
| 2004/0135805 | A1 * | 7/2004 | Gottsacker ........... | G06F 17/211 715/751 |

(Continued)

FOREIGN PATENT DOCUMENTS

| | | | | |
|---|---|---|---|---|
| AU | 2009251763 B2 * | 2/2014 | .......... | G06F 17/241 |
| WO | WO-9841934 A1 * | 9/1998 | ......... | G06F 17/3089 |

(Continued)

*Primary Examiner* — Emmanuel L Moise
*Assistant Examiner* — Robert A Shaw
(74) *Attorney, Agent, or Firm* — Fenwick & West LLP

(57) ABSTRACT

A content management system provides content item sharing and synchronization for users of client devices. The content items stored by content management system can include any type of data, such as digital data, media, data files and databases, source and object code, recordings, and any other type of data or file. A collaboration content item management system allows users to create, edit and share collaboration content items among a plurality of other users. Collaboration content items are files that a users can create and edit using a collaboration content items editor, and are composed of collaboration content item elements. The content management system and collaboration content item management system provide functionality for linking content items with collaboration content items to keep the contents of each synchronized with one another and allow for access of the same content from both systems.

20 Claims, 7 Drawing Sheets

(56) References Cited

U.S. PATENT DOCUMENTS

| | | | | |
|---|---|---|---|---|
| 2005/0022114 | A1* | 1/2005 | Shanahan | G06F 17/30011 715/234 |
| 2007/0244906 | A1* | 10/2007 | Colton | G06F 17/2288 |
| 2009/0006936 | A1* | 1/2009 | Parker | G06F 17/24 715/200 |
| 2009/0327326 | A1* | 12/2009 | Bahr | G06F 16/93 |
| 2010/0153440 | A1* | 6/2010 | Hubert | G06Q 30/0601 707/769 |
| 2013/0013560 | A1* | 1/2013 | Goldberg | G06Q 10/101 707/634 |
| 2013/0014023 | A1* | 1/2013 | Lee | H04L 67/1095 707/634 |
| 2013/0138608 | A1* | 5/2013 | Smith | G06F 16/252 707/609 |
| 2013/0218829 | A1* | 8/2013 | Martinez | G06F 21/6209 726/28 |
| 2013/0246901 | A1* | 9/2013 | Massand | G06F 16/1873 707/695 |
| 2013/0275509 | A1* | 10/2013 | Micucci | H04L 67/02 709/204 |
| 2014/0006351 | A1* | 1/2014 | Laitkorpi | H04L 67/1095 707/634 |
| 2014/0114918 | A1* | 4/2014 | Babich | G06F 16/184 707/634 |
| 2014/0230076 | A1* | 8/2014 | Micucci | G06F 21/6209 726/28 |
| 2015/0019480 | A1* | 1/2015 | Maquaire | G06F 16/252 707/609 |
| 2015/0100548 | A1* | 4/2015 | Mc Erlean | G06F 16/27 707/610 |
| 2015/0134681 | A1* | 5/2015 | Burne | G06F 17/248 707/756 |
| 2015/0227514 | A1* | 8/2015 | Gillett | G06F 17/248 707/756 |
| 2015/0278330 | A1* | 10/2015 | Hawa | G06F 16/275 709/203 |
| 2016/0088077 | A1* | 3/2016 | Liu | H04L 67/1095 709/203 |
| 2016/0147787 | A1* | 5/2016 | Ables | H04L 63/102 |
| 2016/0253373 | A1* | 9/2016 | Fryc | G06F 16/1873 707/695 |
| 2016/0314102 | A1* | 10/2016 | Bezar | G06F 17/248 707/756 |
| 2017/0272444 | A1* | 9/2017 | Kopf | G06F 16/184 707/634 |

FOREIGN PATENT DOCUMENTS

| | | | | |
|---|---|---|---|---|
| WO | WO-0060504 A1 | * | 10/2000 | G06Q 10/10 |
| WO | WO-0120843 A1 | * | 3/2001 | H04L 9/3247 |
| WO | WO-2013009328 A2 | * | 1/2013 | G06Q 10/101 |

* cited by examiner

LINKING CONTENT ITEMS AND COLLABORATION CONTENT ITEMS

TECHNICAL FIELD

The disclosed embodiments generally relate to managing content items and collaboration content items that are shared over a network. In particular, the disclosed embodiments are directed to linking content items with collaboration content items.

BACKGROUND

A content management system provides collaborative sharing of content items and allows multiple users to access and edit content items. A collaboration content item management system allows users to create and edit collaboration content items and share them among a plurality of other users. Content items and collaboration content items are stored differently by their respective systems, which complicates using both systems to edit the same content.

SUMMARY

A content management system provides content item sharing and synchronization for users of client devices. A collaboration content item management system allows users to create, edit and share collaboration content items among a plurality of other users. Users communicate with either of the systems using respective client applications on a client device. Each user of the systems has a user identifier, such as a unique ID number, a user name, or email address. The content management system and collaboration content item management system provide functionality for linking content items with collaboration content items to keep the contents of each synchronized with one another and allow for access of the same content from both systems.

The content items stored by content management system can include any type of data, such as digital data, media, data files and databases, source and object code, recordings, and any other type of data or file. Users may synchronize content items across multiple client devices owned by the user and associated with the user's account, and the user may share content items that are synchronized with devices associated with other users' accounts. Shared content items may be viewed, edited, or collaborated on by sharing users. In one embodiment, synchronized content items are stored locally at one or more client devices.

Collaboration content items are files that users can create and edit using a collaboration content items editor, and contain collaboration content item elements. Collaboration content item elements may include a collaboration content item identifier, one or more author identifiers, collaboration content item texts, collaboration content item attributes, interaction information, comments, sharing users, etc. Collaboration content item elements are stored as database entities, which allows for searching and retrieving the collaboration content items. In one embodiment, collaboration content items are stored at the collaboration content item management system and accessed by client devices through a network. Multiple users may access, view, edit, and collaborate on collaboration content items.

A content linking module of the content management system and a collaboration content item linking module of the collaboration content item management system facilitate linking new content items with existing collaboration content items, linking new collaboration content items with existing content items, and updating linked content items and collaboration content items. Linked content items are updated at the content management system responsive to changes to associated linked collaboration content items at the collaboration content item management system, and linked collaboration content items are updated at the collaboration content item management system responsive to changes to associated linked content items at content management system.

The content linking module creates linked content items at the content management system, sends requests to create linked collaboration content items at the collaboration content item management system, receives updated collaboration content item contents from the collaboration content item management system, and sends updated content items to the collaboration content item management system.

The collaboration content item linking module creates linked collaboration content items at the collaboration content item management system, sends requests to create linked content items at the content management system, receives updated content items from the content management system, and sends updated collaboration content item contents to the content management system. The collaboration content item linking module renders collaboration content item elements to generate collaboration content item contents. In one embodiment, rendering collaboration content item elements includes converting the collaboration content item to a specified syntax that incorporates collaboration content item text, formatting attributes, and other collaboration content item elements to form a representation of the contents of the collaboration content item. The collaboration content item linking module further converts content items received from the content management system to collaboration content item elements, which in one embodiment includes extracting text, formatting attributes, and other elements from content items for storage as collaboration content item elements. The collaboration content item linking module and the content linking module may store link records associating the collaboration content item identifier of a linked collaboration content item to the content item identifier of the associated linked content item.

Described embodiments include a client device and client application, a collaboration content item management system, computer program products, and computer implemented methods.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
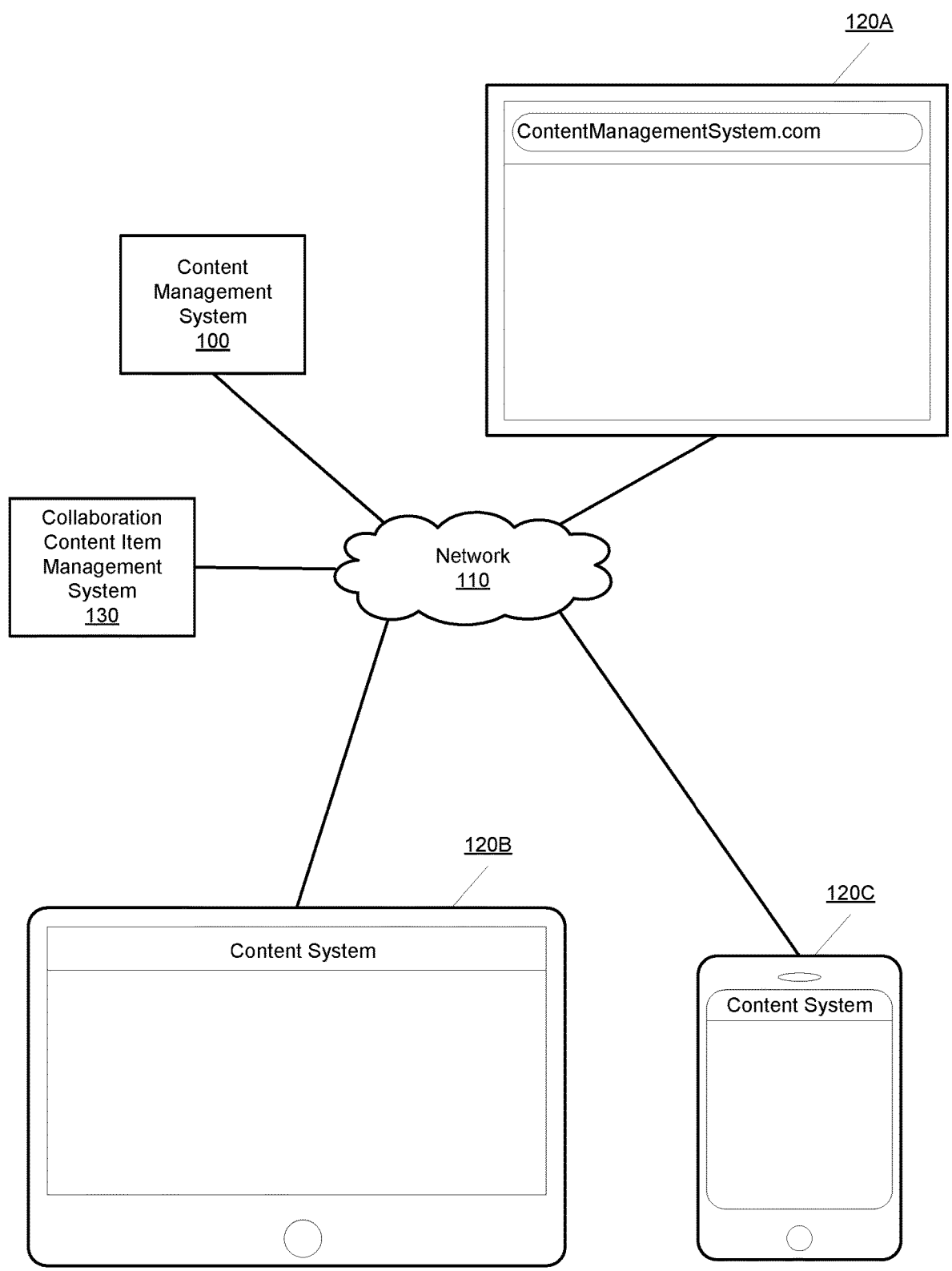
FIG. 1 shows a diagram of a system environment of a content management system and a collaboration content item management system, according to one embodiment.

FIG. 1 shows an example of a system environment including content management system 100, collaboration content item management system 130, network 110, and client devices 120A, 120B, 120C (collectively or individually "120").

Content management system 100 provides content item sharing and synchronization for users of client devices 120. These services allow users to share content with other users of client devices 120. In addition to content item sharing, content management system 100 updates shared content responsive to changes and enables users to synchronize changes in content across multiple client devices 120. A user may synchronize content items across multiple client devices 120 owned by the user and associated with the user's account, and the user may share content items that are synchronized with devices associated with other users' accounts. The content items stored by content management system 100 can include any type of data, such as digital data, media (e.g., images, photos, videos, audio, streaming content), data files and databases, source and object code, recordings, and any other type of data or file. The content items stored by content management system 100 may be organized in one configuration in folders, tables, or in other database structures (e.g., object oriented, key/value etc.). In one embodiment, the content items shared by content management system 100 include content created by using third party applications, e.g., word processors, video and image editors, database management systems, spreadsheet applications, code editors, and so forth, which are independent of content management system 100. Users may create accounts at content management system 100 and store content items thereon by transmitting such content items from client device 120 to content management system 100. The content items provided by users are associated with user accounts that may have various privileges. The privileges may include viewing the content item, modifying the content item, modifying user privileges related to the content item, and deleting the content item.

Collaboration content item management system 130 provides users of client devices 120 with the ability to create, store, access, and share collaboration content items. Collaboration content items are files that a user can create using a collaboration content items editor, which can be hosted by the collaboration content item management system 130, or a collaboration content item editor 260 (FIG. 2) provided on client device 120. In one embodiment, collaboration content items are stored at the collaboration content item management system 130 and accessed by client devices 120 through network 110.

Client devices 120 communicate with content management system 100 and collaboration content item management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
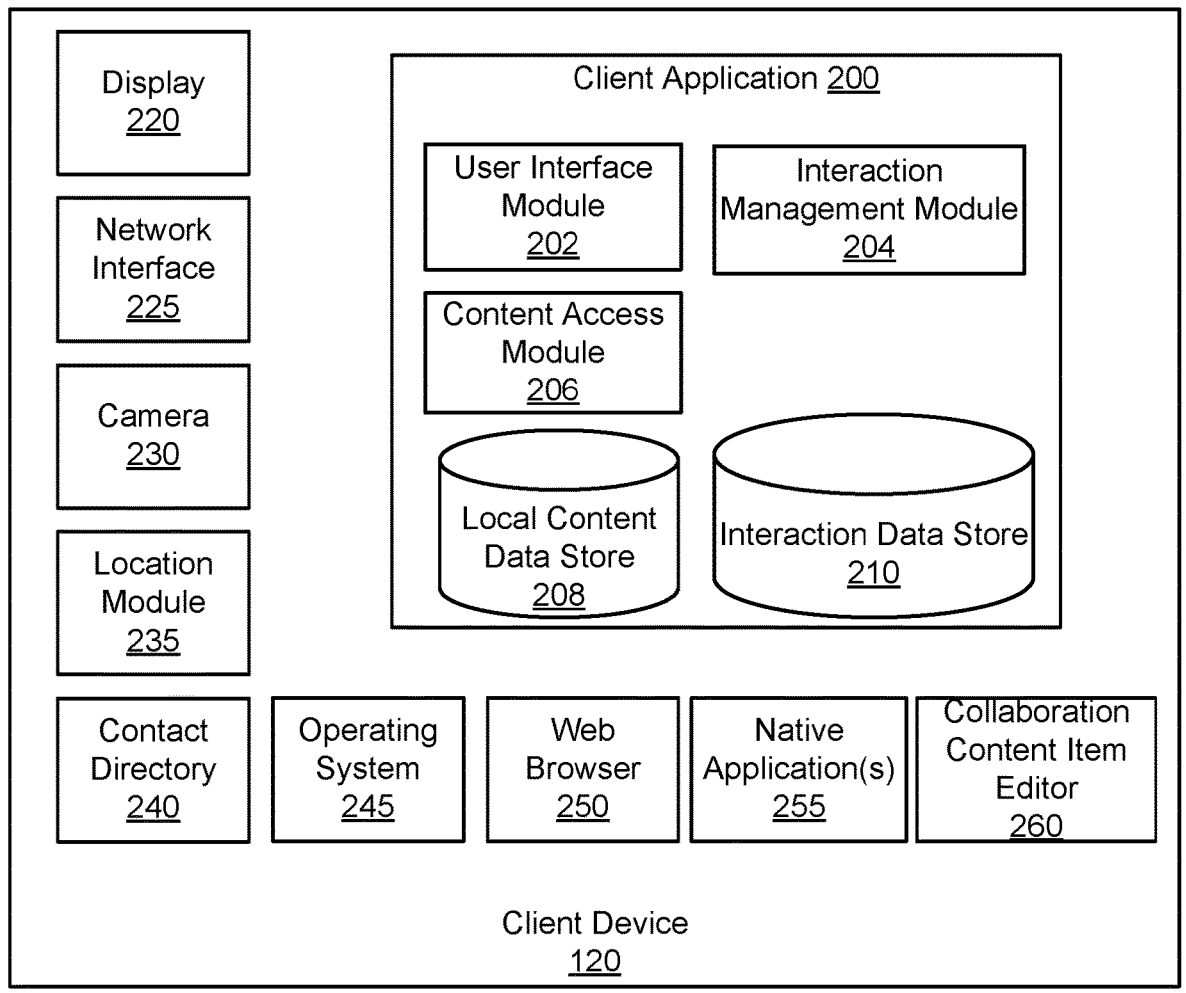
FIG. 2 shows a block diagram of the components of a client device, according to one embodiment.

FIG. 2 shows various modules and components of client device 120 in accordance with one embodiment. Client device 120 includes display 220 for providing information to the user, and in certain client devices 120 includes a touchscreen. Client device 120 also includes network interface 225 for communicating with content management system 100 and collaboration content item management system 130 via network 110. Other conventional components of a client device 120 that are not material are not shown, for example one or more computer processors, local fixed memory (RAM and ROM), as well as optionally removable memory (e.g., SD-card), power sources, and audio-video outputs.

Client devices 120 maintain various types of components and modules for operating the client device and accessing content management system 100 and collaboration content item management system 130. Software modules include operating system 245 and one or more native applications 255. Native applications 255 vary based on the client device, and may include various applications for creating, viewing, consuming, and modifying content stored on content management system 100, such as word processors, spreadsheets, database management systems, code editors, image and video editors, e-book readers, audio and video players, and the like. Software modules may include a collaboration content item editor 260. Collaboration content item editor 260 is configured for creating, viewing and modifying collaboration content items, and may be a standalone application or a web-based application. Operating system 245 on each device provides a local file management system and executes the various software modules such as client application 200 and native application 255. A contact directory 240 stores information about the user's contacts, such as name, picture, telephone numbers, company, email addresses, physical address, website URLs, and the like.

In certain embodiments, client device 120 includes additional components such as camera 230 and location module 235. Camera 230 may be used to capture images or video for upload to the online content management system 100 or collaboration content item management system 130. Location module 235 determines the location of client device 120, using for example a global positioning satellite signal, cellular tower triangulation, or other methods. Location module 235 may be used by client application 200 to obtain location data and add the location data to metadata about a content item or collaboration content item, such as an image captured by camera 230.

Client devices 120 access content management system 100 and collaboration content item management system 130 in a variety of ways. Client application 200 can be a dedicated application or module that provides access to the services of content management system 100 and collaboration content item management system 130, providing both user access to shared content items and collaboration content items through a user interface, as well as programmatic access for other applications. Client application 200 includes user interface module 202 that generates an interface to the content accessed by client application 200 and is one means for performing this function. Client device 120 may also access content management system 100 or collaboration content item management system 130 through web browser 250. As an alternative, client application 200 may integrate access to content management system 100 with the local file management system provided by operating system 245. When access to content management system 100 is integrated in the local file management system, a file organization scheme maintained at content management system 100 is represented as a local file structure by operating system 245 in conjunction with client application 200. Client application 200 may store content accessed from a content storage at content management system 100 in local content data store 208. While represented here as within client application 200, local content 208 may be stored with other data for client device 120 in non-volatile storage. When local content 208 is stored this way, the content is available to the user and other applications or modules when client application 200 is not in communication with content management system 100. Content access module 206 manages updates to local content 208 and communicates with content management system 100 to synchronize content modified by client device 120 with content maintained on content management system 100, and is one means for performing this function. Client application 200 may take various forms, such as a stand-alone application, an application plug-in, or a browser extension.

Interaction management module 204 of client application 200 identifies interactions that take place with respect to a content item, such as when a user opens, closes or edits the content item on the device, or when a user is currently editing or collaborating in a collaboration content item. These interactions are identified by interaction management module 204 to generate interaction information describing the interaction with the content item. Interaction information includes interactions with client application 200, interactions with native application 255, and interactions with content items using client application 200 and native application 255. Interaction information may be stored in interaction data store 210 of client device 120. Interaction information determined from actions of native application 255 is termed presence information. An application, such as client application 200 that determines interaction information and presence information is termed a presence application. Additional types of interaction information (in addition to presence information) include notes, messages, and notification requests related to the content item, which may be received by client application 200. Messages may include chat messages to other devices, and messages indicating a user's intent to interact with (e.g., to edit) a content item. Notification requests may include a request to be notified when another user's interaction information changes. Interaction information also includes metadata modifications, such as versioning notes, or requests for further information stored at content management system 100 about the content item, such as a request to view versioning information or prior content item versions. Further examples of interaction information is described below.

Interaction management module 204 transmits interaction information to other devices 120 that are synchronized with respect to the content item. The indication of intent may for example alert a second user of the content item on another device that the first user would like to edit the content item. Client application 200 identifies when users are using a native application 255 to interact with a content item, and also receives chat or intent information from a user. In various embodiments, device 120 identifies a user's presence in a content item (i.e. that the user has the content item open or is editing the content item).

Figure 3:
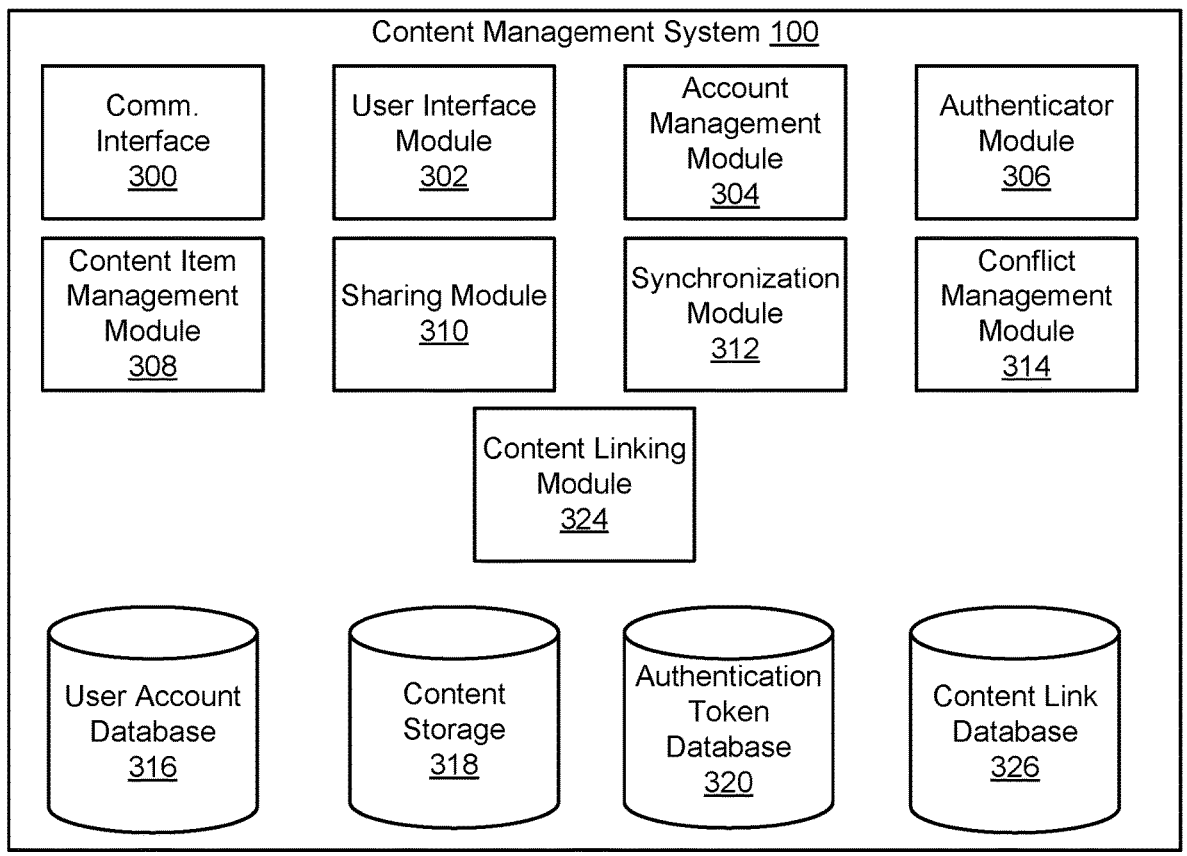
FIG. 3 shows a block diagram of a content management system, according to one embodiment.

FIG. 3 shows a block diagram of content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a user identifier and a user name. Each content item is associated with a content item identifier that uniquely identifies the content item. For purposes of convenience, references herein to information such as content items or other data being "associated" with a user are understood to mean an association between a content item and either of the above forms of user identifier for the user. Similarly, data processing operations on content items and users are understood to be operations performed on corresponding identifiers such as content item identifiers and user identifiers. For example, a user may be associated with a collaboration content item by storing the information linking the user identifier and the content item identifier in a table, file, or other storage formats. For example, a database table organized by content item identifiers can include a column listing the user identifier of each user associated with the content item. As another example, for each user identifier, a file can list a set of content item identifiers associated with the user. As another example, a single file can list key values pairs such as <user identifier, content item identifier> representing the association between an individual user and a content item. The same types of mechanisms can be used to associate users with collaboration content items, comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316.

Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 250 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

Content management system 100 includes a sharing module 310 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. Sharing module 310 includes content identification data in the generated URL, which can later be used by content management system 100 to identify properly and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Content management system 100 includes content linking module 324 for linking content items with collaboration content items of collaboration content item management system 130. In various embodiments, content linking module 324 communicates with collaboration content item management system 130 and other modules of content management system 100 to facilitate linking new content items with existing collaboration content items, linking new collaboration content items with existing content items, and updating linked content items and collaboration content items. In one embodiment, content linking module 324 receives collaboration content item identifiers for linked collaboration content items and stores them along with associated content item identifiers as part of a link record in content link database 326.

Content linking module 324 receives requests from collaboration content item management system 130 to create new content items for linking with existing collaboration content items. Content linking module 324 receives collaboration content item contents associated with the request and stores the contents in content storage 318. Content linking module 324 associates a new content item identifier with the stored contents, and sends the content item identifier to collaboration content item management system 130.

Content linking module 324 receives requests from users and other modules of content management system 100 to link existing content items with new collaboration content items at collaboration content item management system 130. Content linking module 324 sends requests to collaboration content item management system 130 to create collaboration content items for linking with existing content items. Content linking module 324 retrieves content item data from content storage 318 and sends the data to collaboration content item management system 130 for creating linked collaboration content items.

Content linking module 324 receives updated collaboration content item contents from collaboration content item management system 130 to facilitate updates to linked content items. Linked content items are updated at content management system 100 responsive to changes to associated linked collaboration content items at collaboration content item management system 130. In one embodiment, content linking module 324 receives updated collaboration content item contents from collaboration content item management system 130 responsive to changes to the linked collaboration content item. Content linking module 324 updates the linked content item using the updated collaboration content item contents. Content linking module 324 may store the updated collaboration content item contents as a new version of the linked content item. In another embodiment, content linking module 324 determines the differences between the linked content item and the updated collaboration content item contents and only stores the different collaboration content item contents.

Content linking module 324 sends updated content items to collaboration content item management system 130 to facilitate updates to linked collaboration content items. Linked collaboration content items are updated at collaboration content item management system 130 responsive to changes to associated linked content items at content management system 100. Content linking module 324 detects updates to content items and notifies collaboration content item management system 130. In one embodiment, content linking module 324 notifies collaboration content item management system 130 for all updates to content items, and collaboration content item management system 130 determines whether an updated content item is linked to a collaboration content item at collaboration content item management system 130. In another embodiment, content linking module 324 notifies collaboration content item management system 130 responsive to determining that an updated content item is linked to a collaboration content item at collaboration content item management system 130.

Collaboration Content Item Management System

Figure 4:
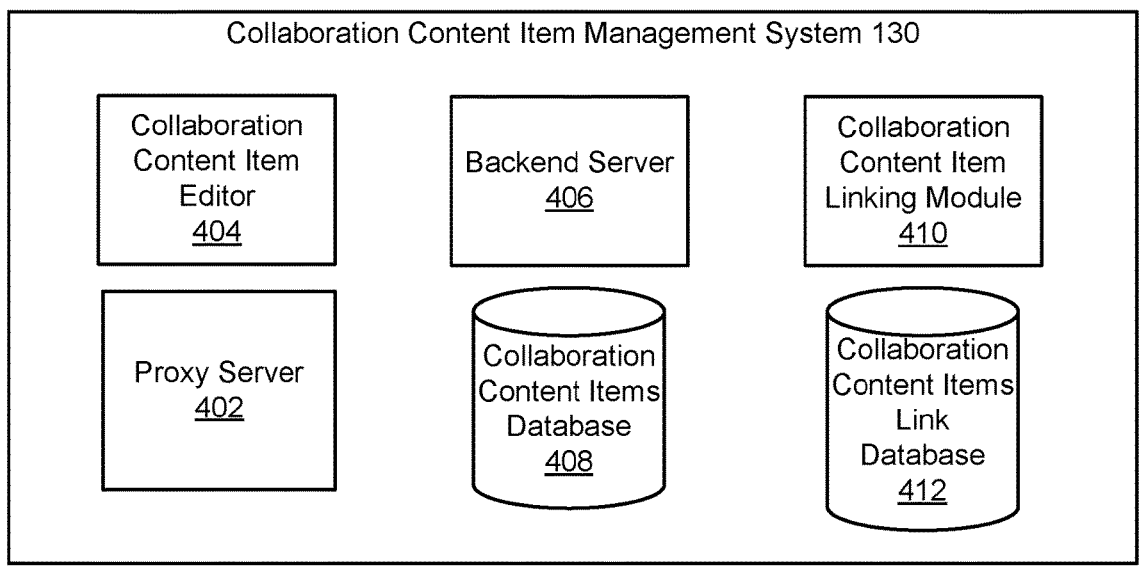
FIG. 4 shows a block diagram of a collaboration content item management system, according to one embodiment.

FIG. 4 shows a block diagram of collaboration content item management system 130, according to one embodiment. Like content items, collaboration content items may be shared and synchronized with multiple users and client devices 120, using sharing module 310 and synchronization module 312 of content management system 100. Users operate client devices 120 to create and edit collaboration content items, and to share collaboration content items with other users of client devices 120.

In the embodiment of FIG. 1, collaboration content item management system 130 is shown as separate from content management system 100, and can communicate with it to obtain its services. In other embodiments, collaboration content item management system 130 is a subsystem of the component of content management system 100 that provides sharing and collaboration services for various types of content items. User account database 316 and authentication token database 320 from content management system 100 are used for accessing collaboration content item management system 130 described herein.

Collaboration content item management system 130 includes various servers for managing access and edits to collaboration content items. Collaboration content item management system includes proxy server 402, collaboration content item editor 404, and backend server 406. Proxy server 402 is responsible for handling requests from client applications 200 and passing those requests to the collaboration content item editor 404. Collaboration content item editor 404 manages application level requests for client applications 200 for editing and creating collaboration content items, and selectively interacting with backend servers 406 for processing lower level processing tasks on collaboration content items, and interfacing with collaboration content items database 408 as needed.

Collaboration content item database 408 stores collaboration content items, comments, and threads as database entities, and provides programmatic access thereto for searching and retrieving these entities and is one means for performing these functions. The database 408 can be implemented in a relational form using separate tables for collaboration content items, threads, and comments, or using objects, BLOBs, files, or other structures.

Each collaboration content item is composed of a number of elements (equivalently fields, columns, or attributes). In one embodiment the elements are as follows:

DocumentID: a unique identifier assigned by the collaboration content item management system 130 to access the collaboration content item.

AuthorID: the user identifier of the user who created the collaboration content item, and may include the user name of the user. These values may be encrypted for privacy.

Creation timestamp: indicates the date and time that the collaboration content item was created.

Text: The text of the collaboration content item is represented as string of ASCII characters.

Attribute_pool: Formatting attributes (e.g., bold, underline, italics, font, font size, line spacing, paragraphs, and the like) that are used in the collaboration content item. The attribute pool is a set of attributeIDs used in the collaboration content item; a native set of attributeIDs and associated formats are provided by the collaboration content item management system 130. The following table is an example of a portion of an attribute pool:

| Attribute ID | Formatting |
|---|---|
| 0 | None |
| 1 | Bold |
| 2 | Italic |
| 3 | Underline |
| 4 | Strikethrough |
| 5 | Superscript |
| 6 | Subscript |
| 7 | Single space |
| 8 | Double space |
| ... | ... |

Attribute_list: Formatting attributes are applied to portions of the text by the attribute list. The attribute list element is a list of (span=attributeID) pairs, where the attributeID indicates the attribute(s) from the attribute pool and the span specifies the number of characters to which the attribute(s) is to be applied when the text is rendered, starting from the end of the previous span, so that the entire length of the collaboration content item is coded for attributes. For example, the text "Text with bold, italic, and bold italic formatting." would be attribute coded as {10-0, 4-1, 2-0, 6-2, 5-0, 11=1 2, 12=0}.

ThreadID_list: a list of all threads that are associated with a collaboration content item.

Author_list: a sequential list of the users who have contributed to the collaboration content item text, according to the sequence of contributed or edited text portions, using the same coding pattern as attribute list, i.e., (span=user identifier) pairs. For example, the author_list {100=199, 50=54, 200=199} indicates that in a text of 350 characters, there is a sequence of three text portion, the user with user identifier 199 authored the first portion with 100 characters, followed by user identifier 54 who authored the second portion with 50 characters, followed again by user identifier 199 who authored the third portion with the remaining 200 characters.

The span coding of the attributes and authors is beneficial because it allows for efficient management of insertions and deletions of text. When text is inserted or deleted, only a limited number of spans following the insertion or deletion need to be modified (those with spans falling within or overlapping the span of the inserted or deleted text), and spans that are not impacted do not need to be updated, since their relative positions are unchanged. In other embodiments, the author list may be organized in a different fashion; for example with the user identifier of each author followed by a list of text portions edited by that user.

Interaction_list: a list of interactions and associated user identifiers for the collaboration content item and other associated information such as timestamps for interactions.

Each thread includes the following elements:

ThreadID: unique identifier assigned by the collaboration content item management system.

DocumentID: the documentID of the collaboration content item that contains the thread.

TextSpan: the text span element identifies the portion of text of the collaboration content item to which the thread applies, using the character position of the first character in the selected text, and the length of the portion. For example, the text span (50, 25) indicates a text portion starting at character position 50 within the collaboration content item and running 25 characters in length.

CommentID_list: a list element of commentIDs of the comments included in the thread.

AuthorID_list: the user identifier of the authors of comments in the thread.

Audience_list. The audience element is a list indicating the users to whom the thread and its comments are displayed when accessing the collaboration content item, and to whom notifications of changes in the thread are sent. The audience comprises the user identifiers of the i) the author of the collaboration content item containing the thread; ii) the authors of comments included in the thread; iii) the authors of any text included in the text span for the thread; iv) any user mentioned in the text span the thread via a user primitive; v) any user mentioned in a comment via user primitive. User primitives are further described below. The inclusion of an audience for each thread allows for fine grain control of which users are notified of, and have access to specific comments as further described below.

Each comment includes the following elements:

CommentID: a unique identifier assigned by the collaboration content item management system 130.

AuthorID: the user identifier of the author of the comments.

Text: a string element storing the text of the comment.

Attribute_list: attribute list element storing the formatting attributes for the text of the comment, in the same manner as described above for collaboration content items.

ThreadID: the threadID of the thread to which the comment belongs.

State: an enumerated variable storing a value indicating the state of the comment as either active or resolved.

Notification_list: the notification element is a list of user identifiers indicating the users to whom a notification of the comment has been sent, as further explained below. This list is updated each time a notification message including the comment is sent to specific user.

Collaboration content item database 408 may also include a set of indices. These indices are logical in nature and may be implemented in various ways, depending on the underlying database design. A user index contains a list of all users by their user identifier, and for each user identifier there is a list of documentIDs. Each documentID identifies a collaboration content item to which the user of the user identifier is associated and has access to. For each documentID, there is a status indicator that indicates whether the collaboration content item is active or inactive for the user. A collaboration content item is active for the user sharing the collaboration content item until the user deletes the collaboration content item. In one embodiment, when the user deletes the collaboration content item, the collaboration content item persists in the collaboration content item database 408 remains associated with the user but status indicator is set to inactive, allowing the user to reactivate their sharing status with the collaboration content item in the future. The collaboration content item remains active for and associated with any other shared users. Alternatively, the collaboration content item may be deleted from the collaboration content item database 408, so that none of the shared users have access to it anymore. The user index is used to identify collaboration content items associated with (shared with) a given user and the status of those collaboration content items with respect to the user.

Collaboration content items database 408 can include a collaboration content item index. The collaboration content item index indicates, for each collaboration content item, a list of user identifiers of users having access to the collaboration content item, and an indication of whether the user is active or inactive. This index can be an inverse of the user index and may be stored together with the user index.

Client application 200 sends a request relating to a collaboration content item to proxy server 402. Generally, a request indicates the user identifier of the user, and the collaboration content item identifier of the collaboration content item, and additional contextual information as appropriate, such as the text of the collaboration content item. When proxy server 402 receives the request, the proxy server 402 passes the request to the collaboration content item editor 404. Proxy server 402 also returns a reference to the collaboration content item editor 404 to client application 200, so the client application can directly communicate with the collaboration content item editor 404 for future requests. In an alternative embodiment, client application 200 initially communicates directly with a specific collaboration content item assigned to the user identifier.

When a collaboration content items editor 404 receives a request, it determines whether the request can be executed directly or by a backend server 406. When the request adds, edits, or otherwise modifies a collaboration content item the request is handled by the collaboration content item editor 404. If the request is directed to a database or index inquiry, the request is executed by a backend server 406. For example, a request from client device 120 to view a collaboration content item or obtain a list of collaboration content items responsive to a search term does not modify collaboration content items and is processed by backend server 406.

Collaboration content item management system 130 includes collaboration content item linking module 410 for linking collaboration content items with content items of content management system 100. In various embodiments, collaboration content item linking module 410 communicates with content management system 100 and other modules of collaboration content item management system 130 to facilitate linking new content items with existing collaboration content items, linking new collaboration content items with existing content items, and updating linked content items and collaboration content items.

Collaboration content item linking module 410 renders collaboration content item elements for sending to content management system 100. In one embodiment, rendering collaboration content item elements includes converting the collaboration content item to a specified syntax that incorporates collaboration content item text, formatting attributes, and other collaboration content item elements to form a representation of the contents of the collaboration content item. In one embodiment, the syntax is a human-readable format, such as Markdown. In various other embodiments, rendering collaboration content item elements includes converting the collaboration content item to a format that is compatible with applications whose files are stored at content management system 100, such as native applications 255.

Collaboration content item linking module 410 converts content items received from content management system 100 to collaboration content item elements. In various embodiments, converting content items includes extracting text, formatting attributes, and other elements from content items for storage as collaboration content item elements in collaboration content item database 408.

Collaboration content item linking module 410 receives requests from users or other modules of collaboration content item management system 130 to create new content items for linking with existing collaboration content items. Collaboration content item linking module 410 sends requests to content management system 100 to create content items with rendered collaboration content item contents, and receives content item identifiers identifying new linked content items in response. Collaboration content item linking module 410 stores content item identifiers for linked content items and collaboration content item identifiers for associated linked collaboration content items as link records in collaboration content item link database 412.

Collaboration content item linking module 410 receives requests from content management system 100 to create new collaboration content items for linking with existing content items at content management system 100. Collaboration content item linking module 410 receives content items, either as part of the request or separately, and converts the content items to collaboration content item elements. Collaboration content item linking module 410 stores the collaboration content item elements at collaboration content item database 408.

Collaboration content item linking module 410 sends updated collaboration content item contents to content management system 100 to facilitate updates to linked content items. As discussed above with respect to FIG. 3, linked content items are updated at content management system 100 responsive to changes to associated linked collaboration content items at collaboration content item management system 130. Collaboration content item linking module 410 detects changes to linked collaboration content items and, in response, renders the collaboration content item elements to create collaboration content item content for sending to content management system 100. Collaboration content item linking module 410 sends collaboration content item contents for updated linked collaboration content items to content management system 100 so that the associated linked content items may be updated.

Collaboration content item linking module 410 receives updated content items from content management system 100 to facilitate updates to linked collaboration content items. As discussed above with respect to FIG. 3, linked collaboration content items are updated at collaboration content item management system 130 responsive to changes to associated linked content items at content management system 100. In one embodiment, collaboration content item linking module 410 receives notifications from content management system 100 when content items are updated. Collaboration content item linking module 410 determines, from collaboration content item link database 412 whether the content items are linked with collaboration content items in collaboration content item database 408. For linked content items, collaboration content item linking module 410 requests the content items from content management system 100. Collaboration content item linking module 410 converts received content items to collaboration content item elements and stores the collaboration content item elements in collaboration content item database 408. In various embodiments, collaboration content item linking module 410 determines which elements or parts of elements of a collaboration content item have changed and only updates changed elements or parts of elements.

Figure 5:
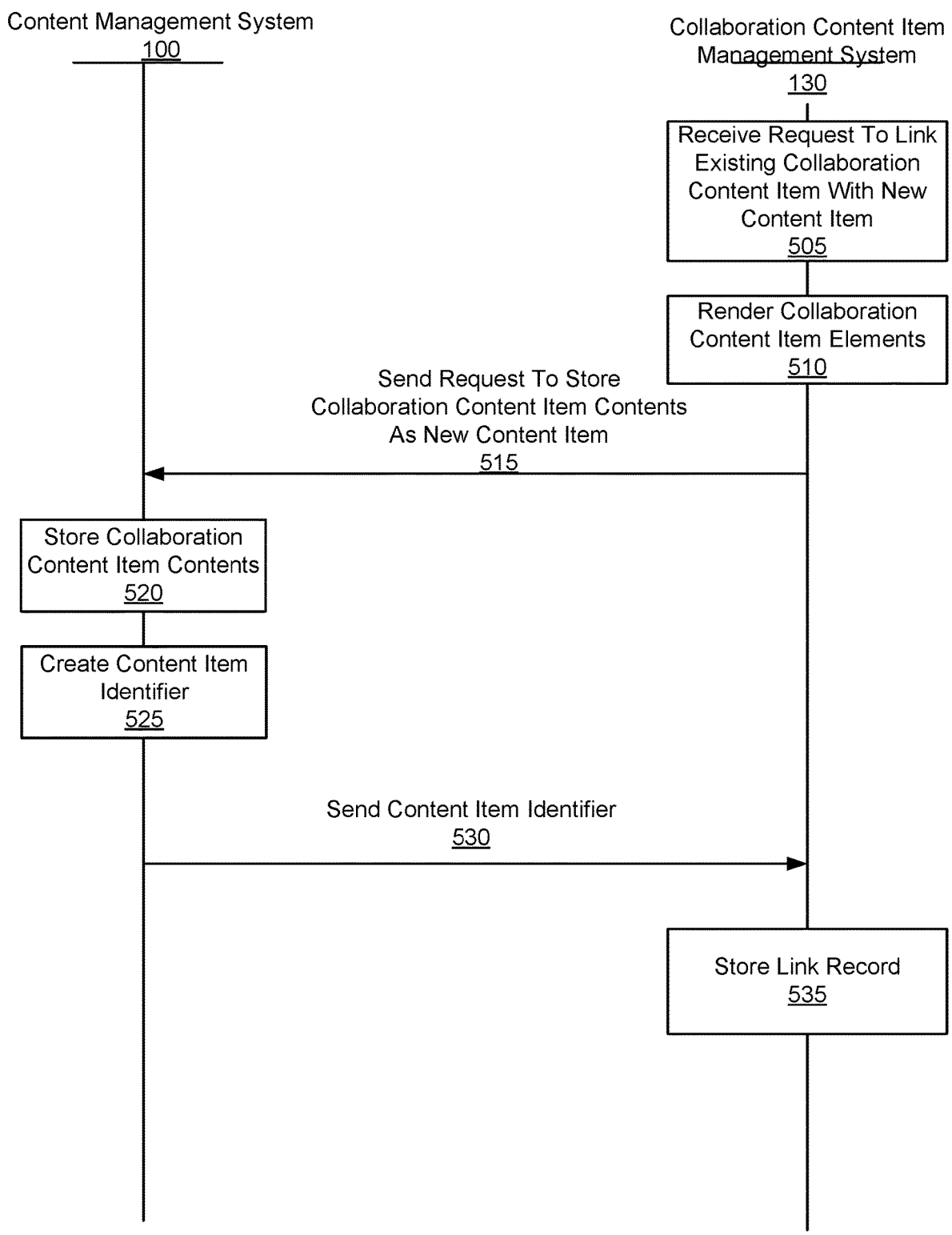
FIG. 5 is an interaction diagram of an example process for creating a content item based on collaboration content item contents and linking the content item to the collaboration content item, according to one embodiment.

FIG. 5 is an interaction diagram of an example process for creating a content item based on collaboration content item contents and linking the content item to the collaboration content item, according to one embodiment. Collaboration content item management system 130 receives 505 a request to link an existing collaboration content item with a new content item. Collaboration content item management system 130 renders 510 the elements of the collaboration content item to generate collaboration content item contents. Collaboration content item management system 130 sends 515 a request to content management system 100 to store the collaboration content item contents as a new content item. Content management system 100 stores 520 the rendered contents and creates 525 a content item identifier associated with the stored data. In one embodiment, collaboration content item management system 130 also sends collaboration content item metadata, such as interaction information, to content management system 100, and content management system 100 stores the collaboration content item metadata as metadata for the content item. Collaboration content item management system 130 may render, reformat, or otherwise process the collaboration content item metadata prior to sending so that it is readable by content management system 100. Content management system 100 sends 530 the content item identifier to collaboration content item management system 130. Collaboration content item management system 130 receives the content item identifier from content management system 100 and stores 535 a link record including the content item identifier and the collaboration content item identifier of the collaboration content item in collaboration content item link database 412.

Figure 6:
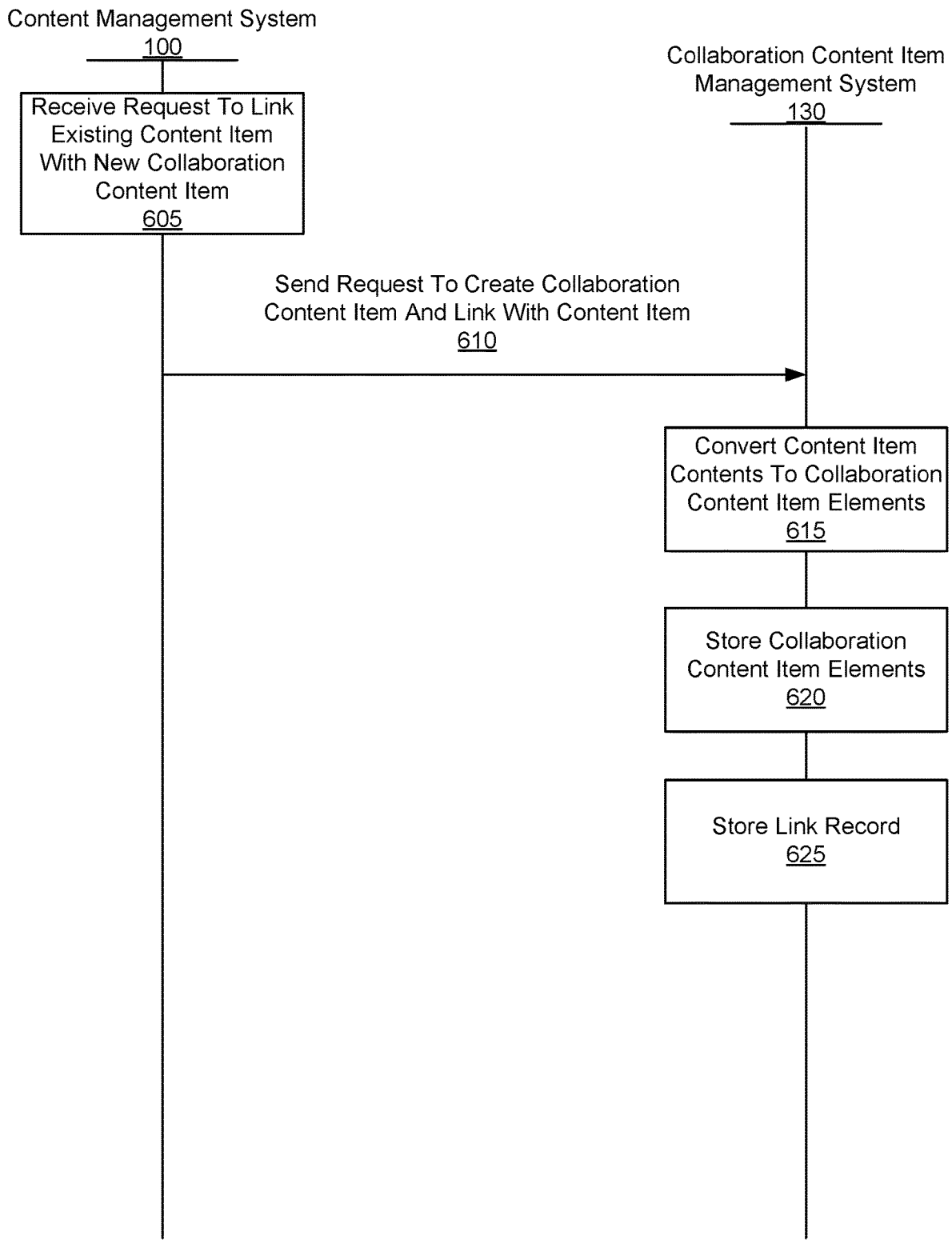
FIG. 6 is an interaction diagram of an example process for creating a linked collaboration content item based on a content item and linking the collaboration content item to the content item, according to one embodiment.

FIG. 6 is an interaction diagram of an example process for creating a linked collaboration content item based on a content item and linking the collaboration content item to the content item, according to one embodiment. Content management system 100 receives 605 a request to link an existing content item with a new collaboration content item. Content management system 100 sends 610 a request to create a collaboration content item and link the content item to collaboration content item management system 130. Collaboration content item management system 130 receives the request and the content item and converts 615 the contents of the content item to collaboration content item elements. In one embodiment, the content item includes metadata such as interaction information that is also converted to collaboration content item element format. Collaboration content item management system 130 stores 620 the collaboration content item elements in collaboration content item database 408 and generates a collaboration content item identifier for the new collaboration content item. Collaboration content item management system 130 stores 625 a link record including the collaboration content item identifier and the content item identifier associated with the content item in collaboration content item link database 412.

Figure 7:
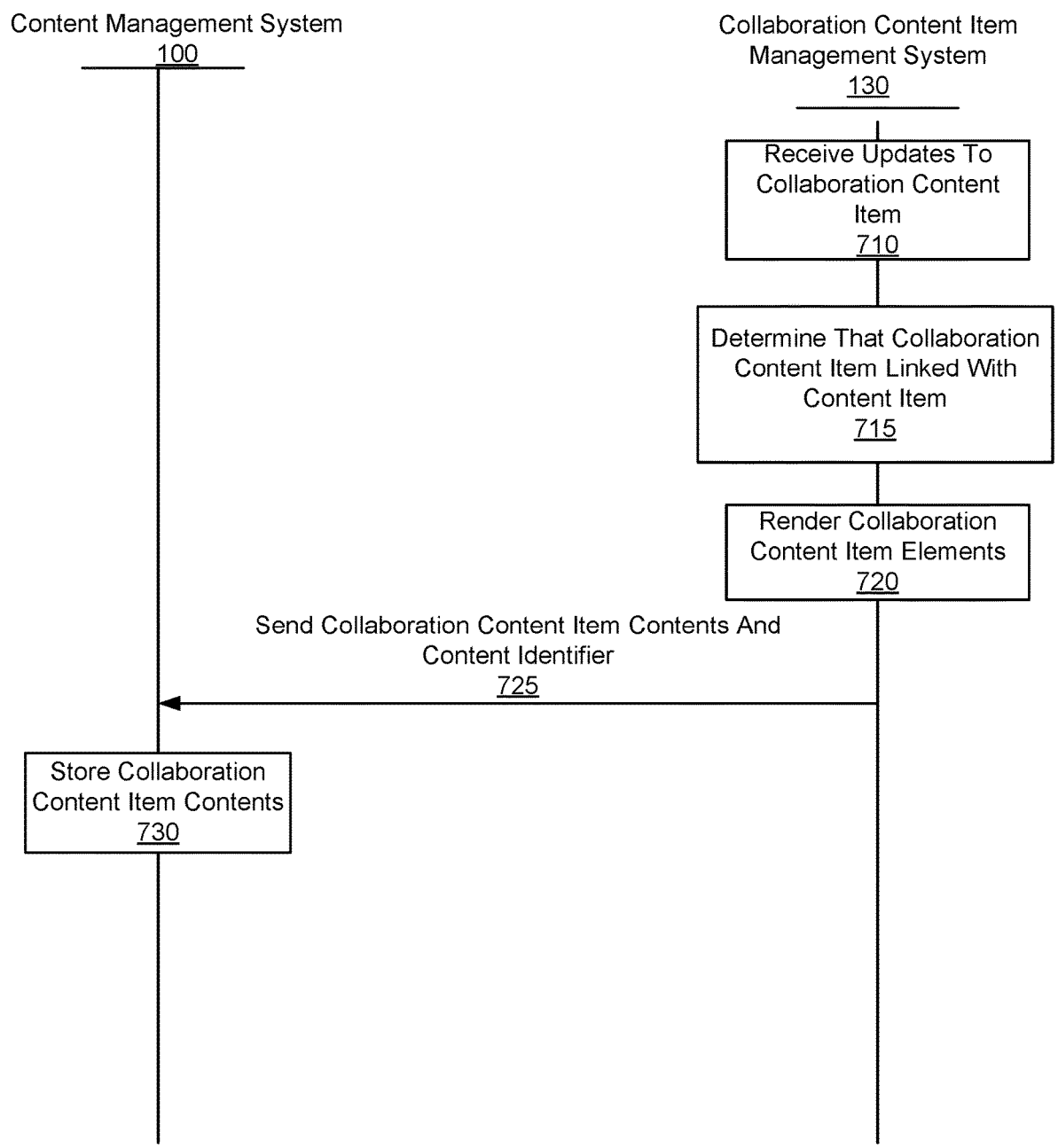
FIG. 7 is an interaction diagram of an example process for updating a content item that is linked to a collaboration content item, according to one embodiment.

FIG. 7 is an interaction diagram of an example process for updating a content item that is linked to a collaboration content item, according to one embodiment. Collaboration content item management system 130 receives 710 updates to a collaboration content item in collaboration content item database 408. Collaboration content item management system 130 determines 715 from collaboration content item link database 412 that the collaboration content item is linked with a content item at content management system 100. Collaboration content item management system 130 renders 720 the collaboration content item elements to generate collaboration content item contents. Collaboration content item management system 130 may render updated collaboration content items responsive to receiving the updates, at regular intervals, or after a change has been made and a specified time has elapsed with no further changes. Collaboration content item management system 130 sends 725 the collaboration content item contents and the content item identifier to content management system 100. In one embodiment, collaboration content item management system 130 sends collaboration content item metadata for storage as content item metadata as discussed above with respect to FIG. 5. Content management system 100 receives the rendered contents and stores 730 the rendered contents as an updated version of the content item.

In one embodiment, just the changes to the collaboration content item are sent by collaboration content item management system 130. Collaboration content item management system may determine from collaboration content item link database 412 which version of the collaboration content item was last sent to content management system 100 and send only data that has changed. In another embodiment, the entire collaboration content item is sent, but content management system 100 stores just the changes. Content management system 100 may determine from the content link database 326 what data is different from a stored version of the content item and update the existing version of the content item stored in content storage 318. In one embodiment, content management system 100 overwrites the previously stored content item with the received rendered contents. In another embodiment, content management system 100 saves the received rendered contents as a new version of the content item.

Figure 8:
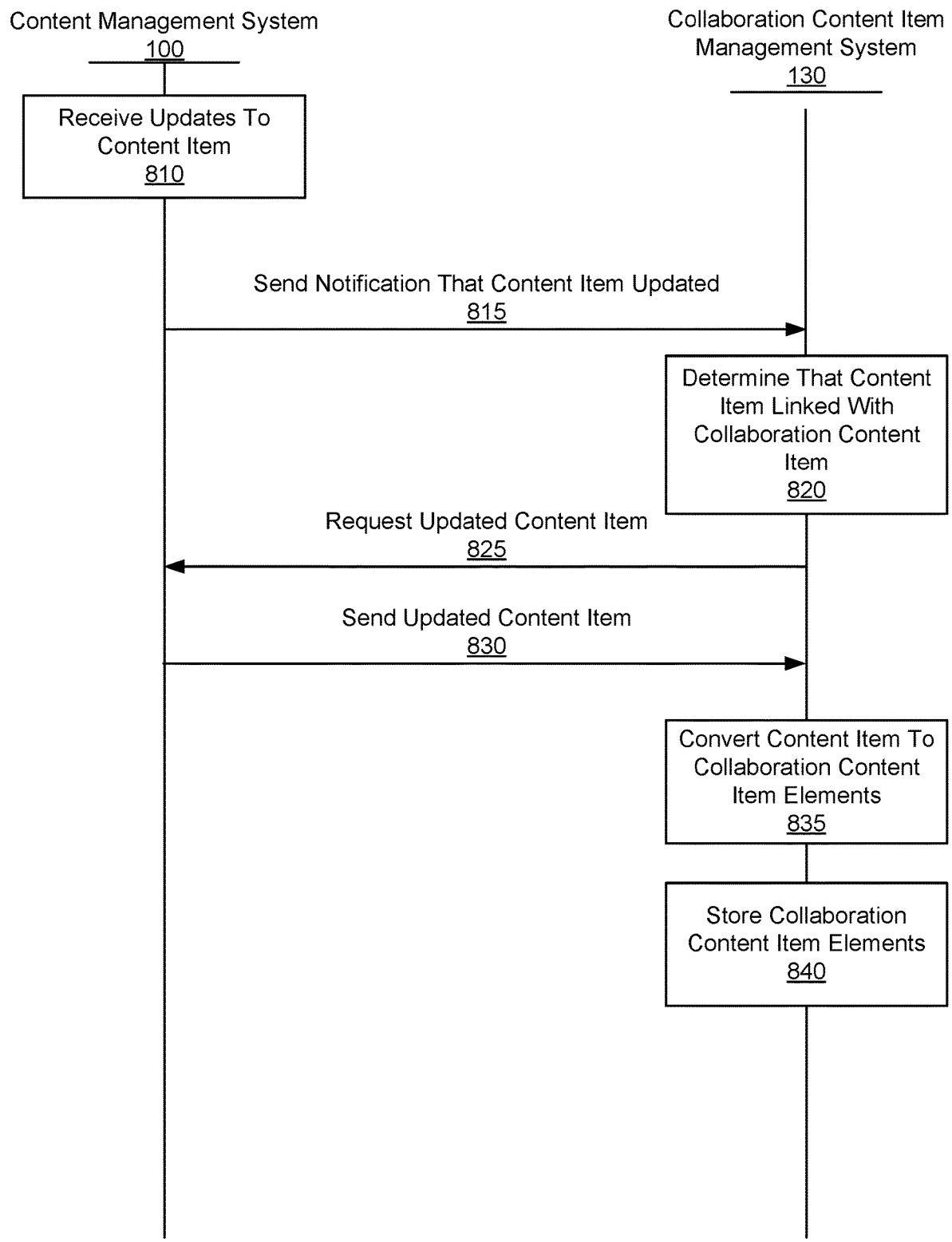
FIG. 8 is an interaction diagram of an example process for updating a collaboration content item that is linked to a content item, according to one embodiment.

FIG. 8 is an interaction diagram of an example process for updating a collaboration content item that is linked to a content item, according to one embodiment. Content management system 100 receives 810 updates to a content item in content storage 318. Content management system 100 sends 815 a notification to collaboration content item management system 130 indicating that the content item has been updated. Collaboration content item management system 130 receives the notification and determines 820 from collaboration content item link database 412 whether the content item is linked to a collaboration content item in collaboration content item database 408. If the content item is not linked to a collaboration content item in collaboration content item database 408, the process ends. If the content item is linked to a collaboration content item in collaboration content item database 408, collaboration content item management system 130 requests 825 the updated linked content item from content management system 100. Content management system 100 sends 830 the updated content item to collaboration content item management system 130 responsive to the request. Collaboration content item management system 130 receives the updated content item from content management system 100 and converts 835 the content item to collaboration content item elements. Collaboration content item management system 130 stores 840 the collaboration content item elements as a new version of the collaboration content item in collaboration content item database 408. In one embodiment, collaboration content item management system 130 overwrites the previously stored collaboration content item elements with the received collaboration content item elements. In another embodiment, collaboration content item management system 130 saves the received collaboration content item elements as a new version of the collaboration content item. In another embodiment, content management system 100 sends the updated content item with the notification of step 815, and collaboration content item management system 130 decides whether to store it by determining if the content item is linked to a collaboration content item in collaboration content item database 408.

In one embodiment, content management system 100 sends only the changes to the content item. Content management system 100 may determine from content link database 326 which version of the content item was last sent to collaboration content item management system 130 and may determine the changes to the content item since that version and send only the data that has changed. In another embodiment, collaboration content item management system 130 may determine from collaboration content item link database 412 what data has changed since the last version of the content item was sent by content management system and update the existing version of the collaboration content item in collaboration content item database 408.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. Languages that formally support the modules include Ada, Algol, BlitzMax, COBOL, D, Dart, Erlang, F, Fortran, Go, Haskell, IBM/360 Assembler, IBM i Control Language (CL), IBM RPG, Java, MATLAB, ML, Modula, Modula-2, Modula-3, Morpho, NEWP, JavaScript, Oberon, Oberon-2, Objective-C, OCaml, several derivatives of Pascal (Component Pascal, Object Pascal, Turbo Pascal, UCSD Pascal), Perl, PL/I, PureBasic, Python, and Ruby, though other languages may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability. For example, content management system 100 and collaboration content item management system 130 may be implemented using a single computer, or a network of computers, including cloud-based computer implementations. For the purposes of this disclosure, a computer is device having one or more processors, memory, storage devices, and networking resources. The computers are preferably server class computers including one or more high-performance CPUs and 1G or more of main memory, as well as 500 GB to 2 Tb of computer readable, persistent storage, and running an operating system such as LINUX or variants thereof. The operations of content management system 100 and collaboration content item management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaboration content items servers, failover servers, network management tools and so forth are not shown so as not to obscure the features of the system. Finally, the functions and operations of content management system 100 and collaboration content item management system 130 are sufficiently complex as to require implementation on a computer system, and cannot be performed in the human mind simply by mental steps.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
receiving, by a collaboration content item management system, a request to synchronize contents of a collaboration content item stored in the collaboration content item management system in a first format with a content management system that uses a second format different from the first format, the collaboration content item comprising collaboration content item elements;
responsive to receiving the request to synchronize:
generating, by the collaboration content item management system, based on the collaboration content item elements, a representation of contents of the collaboration content item, the collaboration content item elements including collaboration content item text and collaboration content item formatting attributes extracted from the first format; and
sending, to the content management system, a request to store the representation as the contents of a new content item, wherein the content management system creates the new content item, responsive to the request to store, in the second format using the extracted formatting attributes;
receiving, by the collaboration content item management system, responsive to the request to synchronize, a content item identifier for the new content item;
storing, at the collaboration content item management system, a link record including the content item identifier and a collaboration content item identifier associated with the collaboration content item stored in the collaboration content item management system, the link record indicating to the collaboration content item management system that when a modification is made to either the collaboration content item or the new content item, the modification is also to be made to the unmodified one of the collaboration content item or the new content item using its respective format by converting the modification to the respective format;
detecting a first modification to the contents of the new content item, the first modification being by a client device of a user;
determining, based on the link record, that the collaboration content item is to be modified according to the first modification;
extracting, from the new content item, first updated collaboration content item text and first updated collaboration content item formatting attributes;
modifying the collaboration content item based on the first updated extracted collaboration content item text and the first updated collaboration content item formatting attributes;
detecting a second modification to the contents of the collaboration content item;
determining, based on the link record, that the new content item is to be modified according to the second modification;
extracting, from the collaboration content item, second updated collaboration content item text and second updated collaboration content item formatting attributes; and
modifying the new content item based on the second updated extracted collaboration content item text and the second updated collaboration content item formatting attributes.

2. The method of claim 1, further comprising:
receiving, from the content management system, a second content item, the second content item comprising an updated version of the content item, wherein the second content item is sent by the content management system responsive to the content item being updated at the content management system;
determining, from the link record, that the second content item is linked with the collaboration content item stored in the collaboration content item management system;
converting, by the collaboration content item management system, the second content item to updated collaboration content item elements; and
storing, at the collaboration content item management system, the updated collaboration content item elements.

3. The method of claim 2, wherein storing the updated collaboration content item elements includes overwriting the collaboration content item elements of the collaboration content item stored in the collaboration content item management system with the updated collaboration content item elements.

4. The method of claim 2, wherein storing the updated collaboration content item elements includes saving the updated collaboration content item elements as a new version of the collaboration content item.

5. The method of claim 2, wherein converting the second content item comprises extracting updated collaboration content item text and updated collaboration content item formatting attributes from the second content item.

6. The method of claim 1, wherein the elements further comprise interaction information and wherein generating a representation of contents of the collaboration content item comprises converting the collaboration content item to a human-readable format.

7. A system comprising:
one or more processors configured to execute instructions;
a non-transitory, non-volatile storage medium containing instructions, which when executed by the one or more processors cause the system to perform the steps of:
receiving a request to synchronize a content item stored in a content management system in a second format with a collaboration content item management system that uses a first format different from the second format;
responsive to receiving the request to synchronize, creating a new collaboration content item in the collaboration content item management system, the creating comprising:
converting contents of the content item having the second format to collaboration content item elements having the first format;
storing the collaboration content item elements at the collaboration content item management system within the new collaboration content item using the first format; and
generating a collaboration content item identifier for the new collaboration content item;
creating, at the collaboration content item management system, a link record comprising the collaboration content item identifier and a content item identifier associated with the content item, the link record indicating to the collaboration content item management system that when a modification is made to either the new collaboration content item or the content item, the modification is also to be made to the unmodified one of the new collaboration content item or the content item in its respective format by converting the modification to the respective format;
detecting a first modification to the contents of the new collaboration content item, the first modification being by a client device of a user;
determining, based on the link record, that the content item is to be modified according to the first modification;
extracting, from the new collaboration content item, first updated content item text and first updated content item formatting attributes; and
modifying the content item based on the first updated extracted content item text and the first updated content item formatting attributes:
detecting a second modification to the contents of the content item;
determining, based on the link record, that the new collaboration content item is to be modified according to the second modification;
extracting, from the content item, second updated content item text and second updated content item formatting attributes; and
modifying the new collaboration content item based on the second updated extracted content item text and the second updated content item formatting attributes.

8. The system of claim 7, wherein the instructions further cause the one or more processors to perform the steps of:
detecting, at the collaboration content item management system, an updated version of the new collaboration content item;
generating, based on the updated version of the new collaboration content item, a representation of contents of the updated version of the new collaboration content item; and
sending the representation to the content management system for updating the content item.

9. The system of claim 8, wherein generating the representation of contents of the updated version of the new collaboration content item occurs a specified period of time after the updated version of the new collaboration content item is detected.

10. The system of claim 7, wherein the instructions further cause the one or more processors to perform the steps of:
receiving, from the content management system, a second content item, the second content item comprising an updated version of the content item, wherein the second content item is sent by the content management system responsive to the content item being updated at the content management system;
determining, from the link record, that the second content item is linked with the new collaboration content item stored in the collaboration content item management system;
converting, by the collaboration content item management system, the second content item to updated collaboration content item elements; and
storing, at the collaboration content item management system, the updated collaboration content item elements, the storing comprising one of overwriting the collaboration content item elements of the new collaboration content item stored in the collaboration content item management system with the updated collaboration content item elements and saving the updated collaboration content item elements as a new version of the new collaboration content item.

11. The system of claim 10, wherein converting the second content item comprises extracting updated collaboration content item text and updated collaboration content item formatting attributes from the second content item.

12. The system of claim 7, wherein the elements further comprise interaction information.

13. The system of claim 7, wherein generating a representation of the collaboration content item comprises converting the collaboration content item to a human-readable format.

14. A computer program product comprising a non-transitory computer-readable storage medium containing computer program code that, when executed, causes one or more processors to perform steps comprising:
receiving a request to synchronize a content item stored in a content management system in a second format with a collaboration content item management system that uses a first format different from the second format;
responsive to receiving the request to synchronize, creating a new collaboration content item in the collaboration content item management system, the creating comprising:
converting contents of the content item having the second format to collaboration content item elements having the first format;
storing the collaboration content item elements at the collaboration content item management system within the new collaboration content item using the first format; and
generating a collaboration content item identifier for the new collaboration content item;

creating, at the collaboration content item management system, a link record comprising the collaboration content item identifier and a content item identifier associated with the content item, the link record indicating to the collaboration content item management system that when a modification is made to either the new collaboration content item or the content item, the modification is also to be made to the unmodified one of the collaboration content item or the content item in its respective format by converting the modification to the respective format;

detecting a first modification to the contents of the new collaboration content item, the first modification being by a client device of a user;

determining, based on the link record, that the content item is to be modified according to the first modification;

extracting, from the new collaboration content item, first updated content item text and first updated content item formatting attributes; and modifying the content item based on the first updated extracted content item text and the first updated content item formatting attributes;

detecting a second modification to the contents of the content item;

determining, based on the link record, that the new collaboration content item is to be modified according to the second modification;

extracting, from the content item, second updated content item text and second updated content item formatting attributes; and modifying the new collaboration content item based on the second updated extracted content item text and the second updated content item formatting attributes.

15. The computer program product of claim 14, wherein the code, when executed, further causes the one or more processors to perform steps comprising:

detecting, at the collaboration content item management system, an updated version of the new collaboration content item;

generating, based on the updated version of the new collaboration content item, a representation of contents of the updated version of the new collaboration content item; and sending the representation to the content management system for updating the content item.

16. The computer program product of claim 15, wherein generating the representation of contents of the updated version of the new collaboration content item occurs a specified period of time after the updated version of the new collaboration content item is detected.

17. The computer program product of claim 14, wherein the code, when executed, further causes the one or more processors to perform steps comprising:

receiving, from the content management system, a second content item, the second content item comprising an updated version of the content item, wherein the second content item is sent by the content management system responsive to the content item being updated at the content management system;

determining, from the link record, that the second content item is linked with the new collaboration content item stored in the collaboration content item management system;

converting, by the collaboration content item management system, the second content item to updated collaboration content item elements; and storing, at the collaboration content item management system, the updated collaboration content item elements, the storing comprising one of overwriting the collaboration content item elements of the new collaboration content item stored in the collaboration content item management system with the updated collaboration content item elements and saving the updated collaboration content item elements as a new version of the new collaboration content item.

18. The computer program product of claim 17, wherein converting the second content item comprises extracting updated collaboration content item text and updated collaboration content item formatting attributes from the second content item.

19. The computer program product of claim 15, wherein the elements further comprise interaction information.

20. The computer program product of claim 15, wherein generating a representation of the new collaboration content item comprises converting the collaboration content item to a human-readable format.

* * * * *